(12) United States Patent
Min

(10) Patent No.: US 7,327,782 B2
(45) Date of Patent: Feb. 5, 2008

(54) RECEIVING APPARATUS AND METHOD OF HIGH SPEED DIGITAL DATA COMMUNICATION SYSTEM

(75) Inventor: Kyung-Ho Min, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 840 days.

(21) Appl. No.: 10/674,383

(22) Filed: Oct. 1, 2003

(65) Prior Publication Data

US 2004/0202238 A1 Oct. 14, 2004

(30) Foreign Application Priority Data

Apr. 8, 2003 (KR) .................. 10-2003-0022045

(51) Int. Cl.
*H04B 1/38* (2006.01)
*H04L 23/02* (2006.01)

(52) U.S. Cl. ...................... 375/222; 375/261
(58) Field of Classification Search ........... 375/222, 375/223, 261, 264, 286, 316, 322
See application file for complete search history.

(56) References Cited

U.S. PATENT DOCUMENTS 5,471,508 A * 11/1995 Koslov .................. 375/344
5,754,591 A * 5/1998 Samueli et al. .......... 375/235
6,005,897 A * 12/1999 McCallister et al. ..... 375/340
6,567,475 B1 * 5/2003 Dent et al. ............... 375/286
6,947,490 B1 * 9/2005 Edwards et al. ......... 375/261

FOREIGN PATENT DOCUMENTS

JP      09-186635     7/1997
WO    WO 01/39454 A1  5/2001

OTHER PUBLICATIONS

Japanese Office Action.

* cited by examiner

*Primary Examiner*—Don N. Vo
(74) *Attorney, Agent, or Firm*—Ked & Associates, LLP

(57) ABSTRACT

A receiving apparatus of a high speed digital data communication system includes: a mobile station modem (MSM) for judging a modulation method according to a data rate of a received signal and a position of a data pointer; a controller for controlling a control signal with respect to a position change of the data pointer on the basis of the information collected by the MSM; and a demodulator for determining a position of the data pointer according to the control signal outputted from the controller and demodulating a signal. By varying a position interval of data pointers according to a data rate, an error probability due to a noise can be reduced and a speech quality can be improved.

21 Claims, 7 Drawing Sheets

RECEIVING APPARATUS AND METHOD OF HIGH SPEED DIGITAL DATA COMMUNICATION SYSTEM

BACKGROUND OF THE INVENTION

1. Field of the Invention

The present invention relates to a communication system and, more particularly, to a high speed data communication and method.

2. Background of the Related Art

Recently, mobile communication systems provide high quality Internet service, mobile image contents service such as VOD, and a personal-centered service including a credit card, diverse identifications and electronic seal impression function, as well as a voice service provided in the next-generation mobile communication system. Accordingly, in order to provide multimedia service to meet various demands of users, attention is increasingly paid to the mobile communication system and its technological development.

CDMA 2000, currently available for high speed data transmission, uses a spread spectrum communication technique that can be roughly divided into a CDMA 2000 1× and 1×EV-DO. CDMA 2000 1× is a service supportable up to 153.6 kbps, which is far faster than 9.6 kbps or 65 kbps, the rate supported in IS-95A or IS-95B networks. CDMA 2000 1× uses the IS-95C network developed from IS-95A and IS-95B. It can support diverse multimedia services as well as improve voice and Wireless Application Protocol (WAP) service quality. In addition, its coverage is extended to business, electronic commercial transactions, and a high-tech industrial fields beyond the personal communications.

1×EV-DO (1× Evolution-Data Optimized), a packet data-only protocol optimized for a high speed/high capacity data transmission, transmits data to a user by using a CDMA channel, having the same frequency band as that of the CDMA 2000×1. 1×EV-DO accomplishes a data rate of about 2.4 Mbps, which is 16 times faster when compared to 153.6 kbps of a forward channel of CDMA 2000 1× and has about 5 times greater capacity than CDMA 2000 1×. Thus, 1×EV-DO can provide a high speed data service simultaneously to numerous users. With the enhanced data transfer rate and capacity, 1×EV-DO provides diverse multimedia content such as radio Internet access, real-time traffic information, Internet game, M-commerce, and the like. 1×EV-DO maximizes a use efficiency of a radio section and a system by dynamically allocating a transfer rate of each user in the radio section and utilizing at the maximum a time slot of a packet data.

FIG. 1 illustrates a structure of a receiving apparatus of a base station of a mobile communication system in accordance with a conventional art, which can be also applied to the CDMA-2000 1× and 1×EV-DO system. The conventional receiving apparatus of the base station of a mobile communication system includes: a low noise amplifier (LNA) 1 for amplifying an RF signal received through an antenna from outside; a first band pass filter 2 for removing a spurious wave component of a signal outputted from the LNA 1; a frequency mixer 3 for mixing an output signal of the first band pass filter 2 with an output signal of a voltage control oscillator 9 and outputting an IF signal; a second band pass filter 4 for filtering a specific part of the output signal of the frequency mixer 3; a demodulator 5 for outputting an output signal of the second band pass filter 5 as separate signal 'I' and signal 'Q'; and an MSM (mobile station modem) 7 for converting the I/Q signal of the demodulator 5 into a digital signal and reproducing an original signal.

The frequency mixer 3 mixes an output signal of the voltage control oscillator 9 under the control of a phase locked loop 8 and the RF signal outputted from the first band pass filter 2 and outputs an IF signal. The MSM 7 includes an analog/digital converter 10 for converting the IQ signal to a digital signal when the I/Q signal outputted from the demodulator 5 is inputted thereto after being filtered through a low pass filter 6. The digital signal outputted from the analog/digital converter 10 is reproduced to its original signal in the MSM 7.

The operation of the receiving apparatus of the base station in the mobile communication system will now be described. The RF signal inputted through the antenna is amplified by the low noise amplifier 1, and as the amplified RF signal passes the first band pass filter 2, its spurious wave component is removed. The spurious wave component-removed signal is inputted to the frequency mixer 3, where it is mixed with a signal inputted through the voltage control oscillator 9, to be outputted as the IF signal and then inputted to the second band pass filter 4.

The second band pass filter 4 filters the IF signal outputted from the frequency mixer 3 and inputs it to the demodulator 5. The IF signal inputted to the demodulator 5 is converted into the I/Q signal, inputted to the low pass filter 6 and filtered therein. Each I/Q signal outputted through the low pass filter 6 is converted into digital signals by the analog/digital converter 10 and is reproduced to an original signal through the MSM 7.

In general, in the case of the currently used 1×EV-DO system, the forward channel transmitting data from the base station to the mobile communication terminal communicates with 12 data rates, while a backward channel transmitting data from the mobile communication terminal to the base station communicates with 5 data rates. A backward data transfer rate is automatically controlled in and transmitted from the base station depending on a communication quality between the mobile communication terminal and the base station and the data transfer rate.

Every forward channel inputted as the I/Q data is time-divided and transmitted as a signal to a radio section. Various modulation methods are used for the forward channel according to a channel condition: a quadrature phase shift keying (QPSK) is used for 8 types of transfer rates from 38.4 kbps to 1228.8 kbps; from 924 kbps to 1843.2 kbps, 8 PSK (phase shift keying) is used; and at 1228.8 kbps and 2457.6 kbps 16 QAM (quadrature amplitude modulation) is used. That is, the modulation method is changed according to the data transfer rate, and the QPSK method is used for low speed data transfer, while the 16 QAM method is used for high speed transfer data.

FIGS. 2A, 2B and 2C illustrate general modulation methods used for 1×EV-DO. FIG. 2A shows the QPSK method. FIG. 2B shows the 8 PSK method. FIG. 2C shows the 16 QAM method. The QPSK method has 4 types of 2-bit digital signals 00, 01, 10 and 11 that are discriminately transmitted. Because each signal is apart from the origin with a predetermined distance with respect to the I/Q axis, a content of the signals can be judged only by the phase.

The 8 PSK method has 8 types of 3-bit digital signals 000, 001, 010, 011, 100, 101 and 110 are discriminately transmitted. As shown in FIG. 2B, a phase of a signal is modulated, for transmission, at 8 code pointers arranged at regular intervals on a circumference representing a phase of a carrier.

In the 16 QAM method, digital signals are classified as a certain quantity and modulated by changing a carrier signal and a phase. At this time, since the size as well as the phase is used as a variable, a large quantity of digital data can be simultaneously transmitted. However, this method is susceptible to error while decoding the transmittal signal.

FIG. 3 is a graph of a general signal determining theory showing a probability (P(Z/S1)) that a signal S1 is distributed at one point on the time axis and a probability (P(Z/S2)) that a signal S2 is distributed at one point on the time axis. As shown in FIG. 3, there is some error probability at a certain section on the basis of the time axis '0'. Little error is generated at the point P1 because there is no probability that S2 exists there. However, an error is generated at the point P2 because the actual signal S1 is recognized as the signal S2.

FIGS. 4A and 4B illustrate the same noise generated when the signal determining theory is adopted to the system of the QPSK method and the 16 QAM method. With reference to FIG. 4A, in the CDMA 2000 1× system using the QPSK method, data is transited as a phase error as much as 't' is generated due to noise, but the data is judged not to have an error. With reference to FIG. 4B, in the ax EX-DO system using the 16 QAM method, if data is transited as a phase error is generated as much as 't' due to noise, a probability is high in judging that there is an error in the data.

That is, assuming that the phase error generated due to various noises existing in the same receiving apparatus is the same, the high speed data communication using the 16 QAM is more sensitive to the error compared to the low speed data communication using the QPSK. Therefore, in the conventional receiving apparatus of high speed digital data communication systems, the phase error generation probability due to noise generation is high compared to the low speed data communication, not only the receive sensitivity is deteriorated but also the performance of the receiving apparatus is degraded.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of one embodiment of the present invention is to provide a high speed digital data communication system.

Another object of one embodiment of the present invention is to improve receiver sensitivity in a communication system.

Another object of one embodiment of the present invention is to minimize the influence of noise in a communication system.

To achieve at least the above objects in whole or in parts, there is provided a receiving apparatus of a high speed digital data communication system including: an MSM for judging a modulation method according to a data rate of a received signal and a position of a data pointer; a controller for controlling a control signal with respect to a position change of the data pointer on the basis of the information collected by the MSM; and a demodulator for determining a position of the data pointer according to the control signal outputted from the controller and demodulating a signal.

To achieve at least the above objects in whole or in parts, there is provided a receiving apparatus of a high speed digital data communication system including: an amplifier for amplifying an inputted RF signal; a band pass filter for removing a spurious wave component of a signal outputted from the amplifier; a frequency mixer for mixing an output signal of the band pass filter and an output signal of a voltage control oscillator and outputting an IF signal; an MSM for judging a data modulation method according to a rate of a received data; a controller for generating a control signal for changing a position of a data pointer according to a data rate of a received signal; and a demodulator for demodulating an output signal of the frequency mixer according to the control signal.

To achieve at least these advantages in whole or in parts, there is further provided a receiving method of a high speed digital data communication system including: judging a data modulation method of a received signal; and changing a position interval of each data pointer of the corresponding data modulation method.

To achieve at least these advantages in whole or in parts, there is further provided a receiving method of a high speed digital data communication system including: judging a data rate of a received signal; determining a data modulation method; controlling a position interval of each data pointer of the corresponding data modulating method; and changing and determining a position of a data pointer according to a control signal.

To achieve at least these advantages in whole or in parts, there is further provided a receiving method of a high speed digital data communication system including: receiving a signal of a high speed data modulation method; controlling to change a position of an outer data pointer from a position of the basic data pointer; and demodulating a received signal centering around a changed data pointer.

To achieve at least these advantages in whole or in parts, there is further provided a communication system comprising: a judging device configured to judge a modulation format according to a data rate of a received signal and a data location, wherein the data location is at a predetermined distance with respect to the I/Q axis; a controller configured to generate a control signal with respect to a position change of the phase data location on the basis of the modulation method and the data rate; and a demodulator configured to determine a position of the phase data location according to the control signal outputted from the controller and to demodulate the received signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 5:
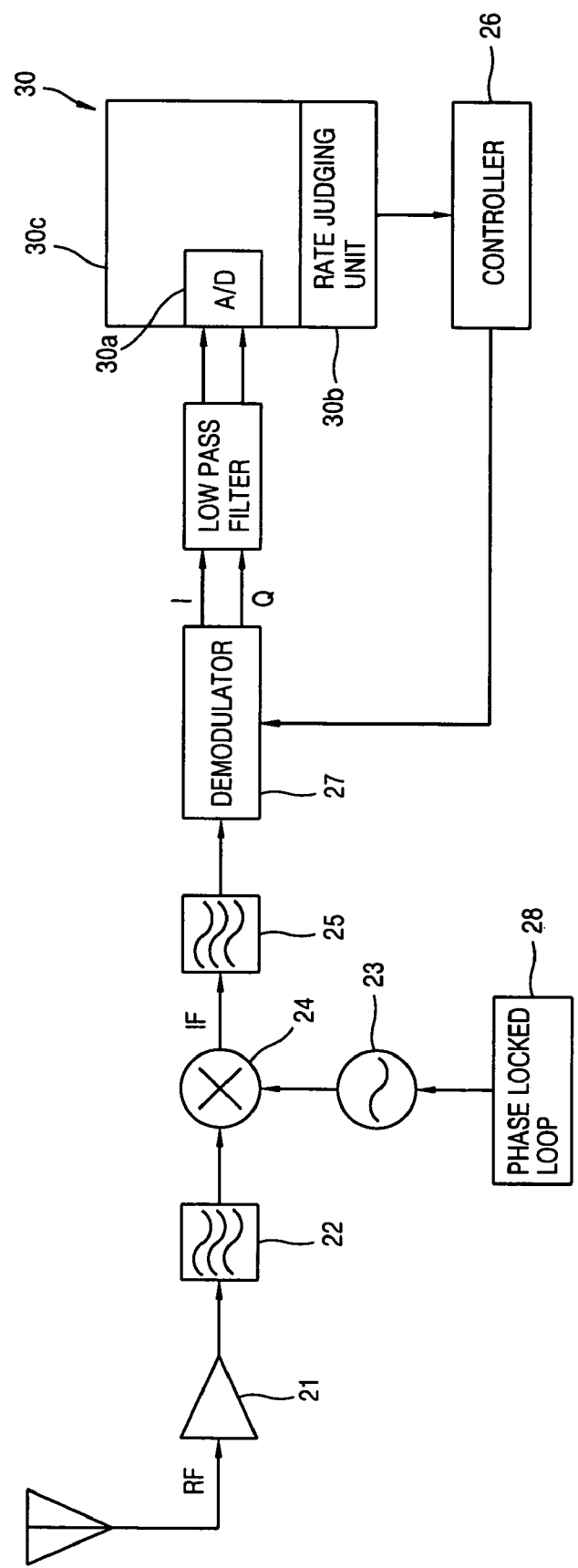
FIG. 5 is a schematic block diagram of a receiving apparatus of a high speed digital data communication system in accordance with an embodiment of the present invention.

FIG. 5 is a schematic block diagram of a receiving apparatus of a high speed digital data communication system in accordance with an embodiment of the present invention. As shown in FIG. 5, the receiving apparatus includes: a low noise amplifier 21 for amplifying a signal inputted through an antenna; a first band pass filter 22 for removing a spurious wave component of a signal outputted from the low noise amplifier 21; a frequency mixer 24 for mixing an RF signal outputted from the first band pass filter 22 and an output signal of a voltage control oscillator 23 and outputting an IF signal; a second band pass filter 25 for filtering an output signal of the frequency mixer 24; an MSM 30 for judging a modulation method of a data according to a rate of a received data and accordingly controlling it; a controller 26 for determining a position of a data pointer according to the modulation information transmitted from the MSM 30; and a demodulator for varying a demodulation method of a received signal according to a control signal of the controller 26 and separately outputting an I-signal and a Q-signal.

The frequency mixer 24 mixes an output signal of the voltage control oscillator 23 under the control of a phase locked loop 28 and the RF si band pass filter 22 and outputs an IF signal. The demodulator 27 demodulates a signal received by a system by adjusting an interval of a data pointer according to the control signal of the controller 26. The MSM 30 includes: an analog/digital converter 30a for converting I/Q signal transmitted through the low pass filter into judging unit 30b for sensing a data rate of a signal received by the system; and a baseband modem 30c.

Figure 1:
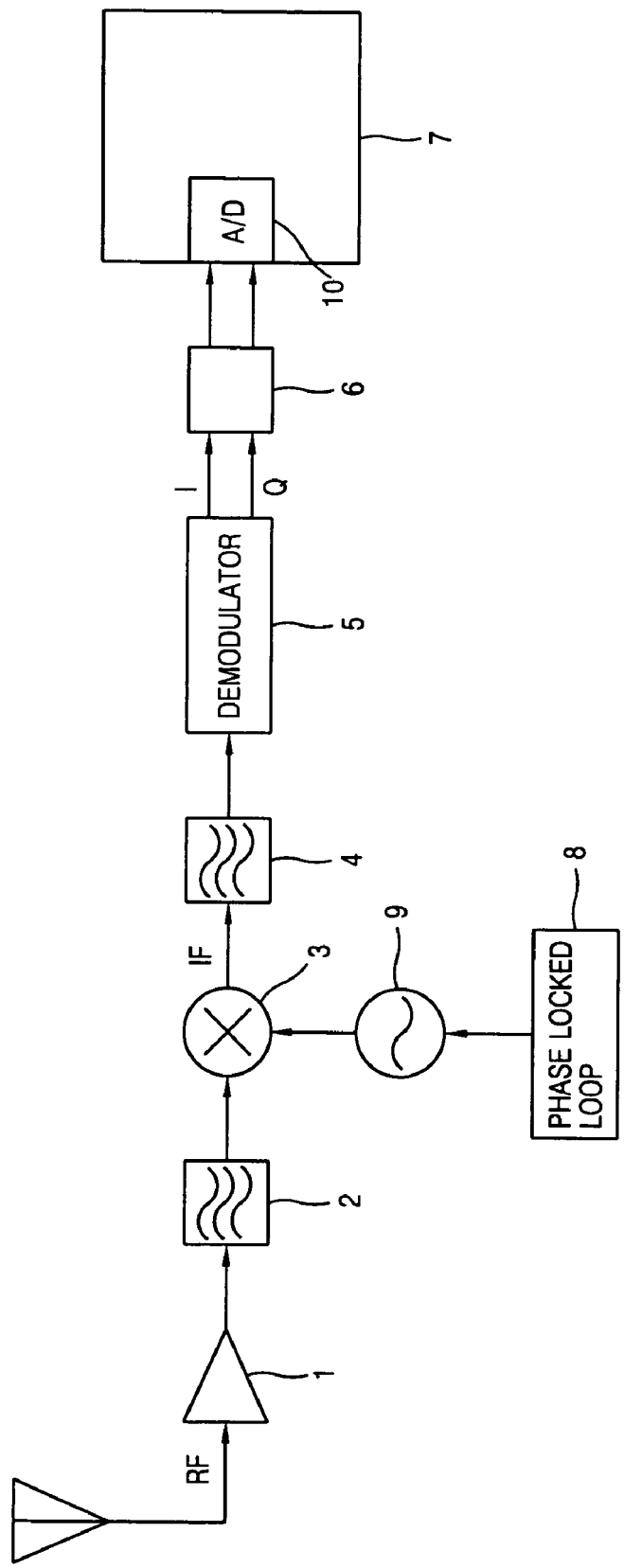
FIG. 1 is a schematic block diagram of a receiving apparatus of a base station of a mobile communication system in accordance with the conventional art.
Figure 2A:
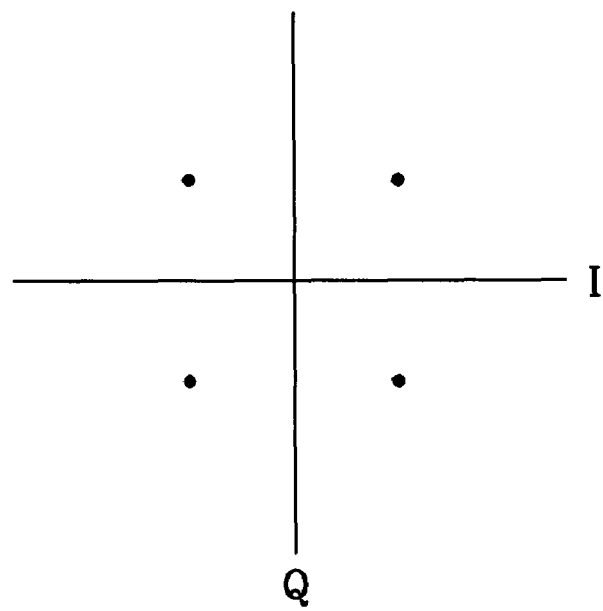
FIGS. 2A, 2B and 2C show QPSK method, 8 PSK method and 16 QAM method, respectively.
Figure 2B:
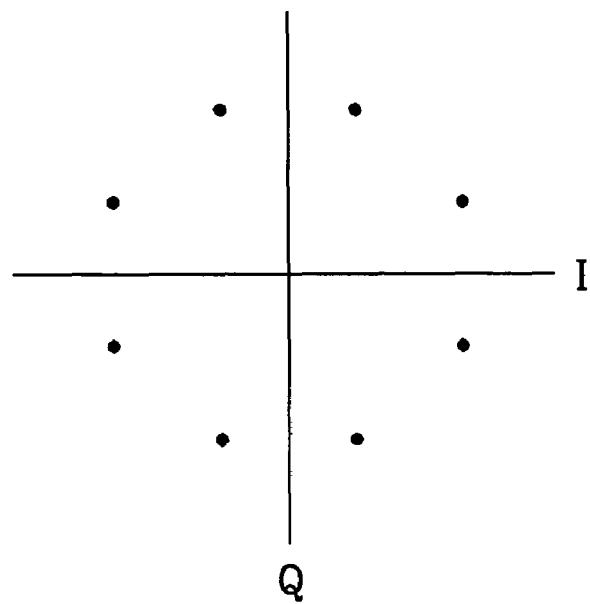
Figure 2C:
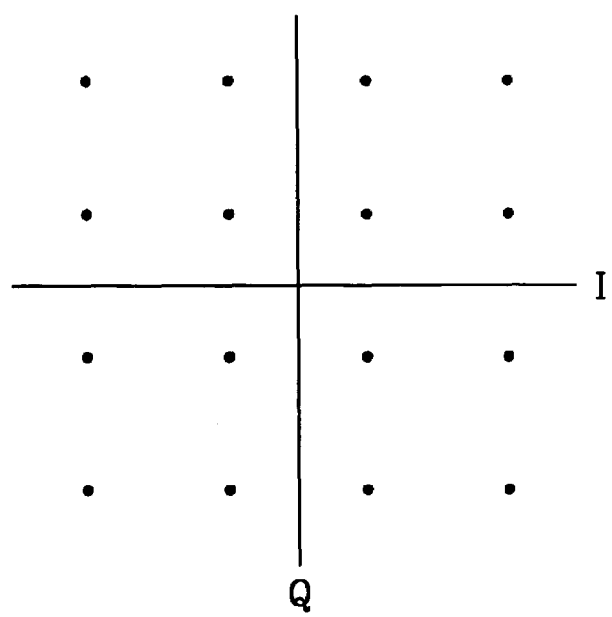
Figure 3:
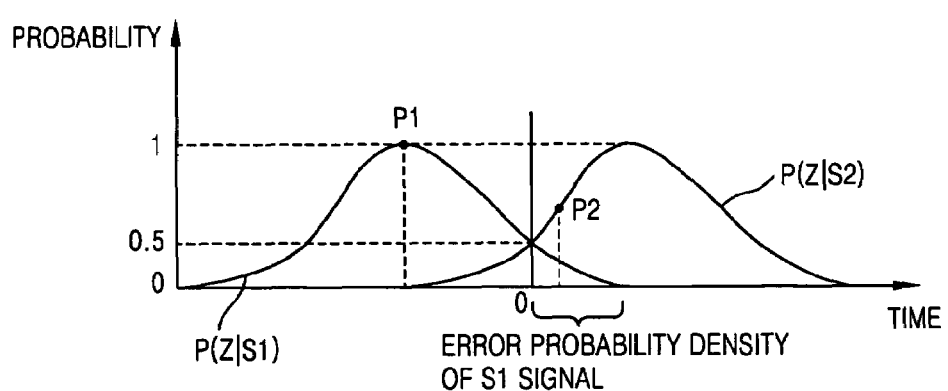
FIG. 3 shows a general signal determining theory.
Figure 4A:
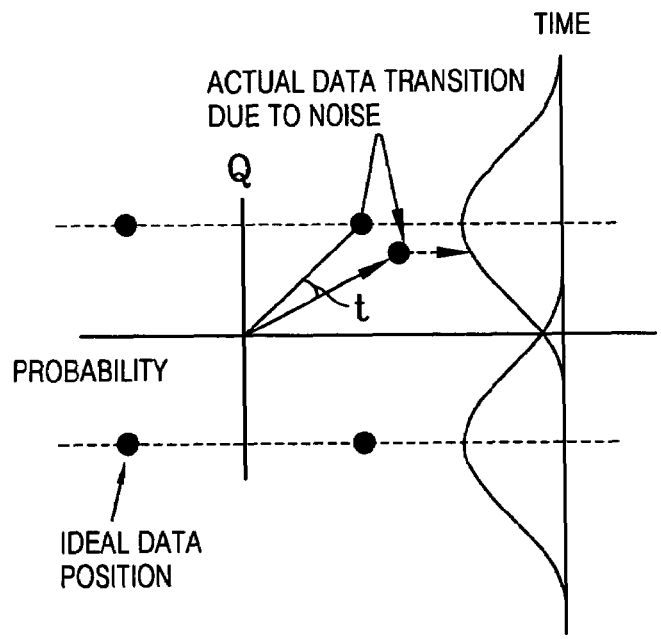
FIGS. 4A and 4B illustrate respectively cases where the signal determining theory of FIG. 3 is adopted for system of the QPSK method and the 16 QAM method.
Figure 4B:
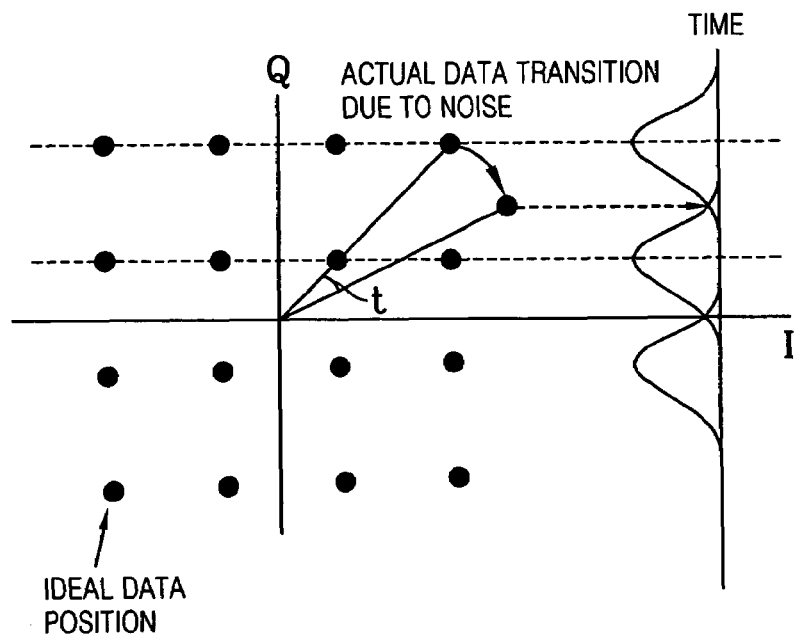

Accordingly, a receiving apparatus in accordance with an embodiment of the present invention additionally includes the particular function units 30a, 30b and 30c of the MSM and the controller 26 when compared to the conventional receiving apparatus of FIG. 1. The modulation method of the data received by the system and the interval between corresponding data pointers are judged and the interval of the data pointer is determined by controlling the demodulator 27. The interval between outer data pointers is determined to be greater than the interval between inner data pointers, in order to reduce an error probability.

In general, when a communication system for low speed data is used for high speed data or when a communication system it is used exclusively for high speed data, the receiving apparatus of a high speed digital data communication system maximizes a bit efficiency by using the 16 QAM or higher modulation method. The MSM 30 of an embodiment of the present invention judges the modulation method of the received data and the interval between data pointers and informs the controller 26 accordingly. Then, the controller 26 controls the demodulator 27 to change the position of the data pointer on the basis of the information received from the MSM 30.

Figure 6A:
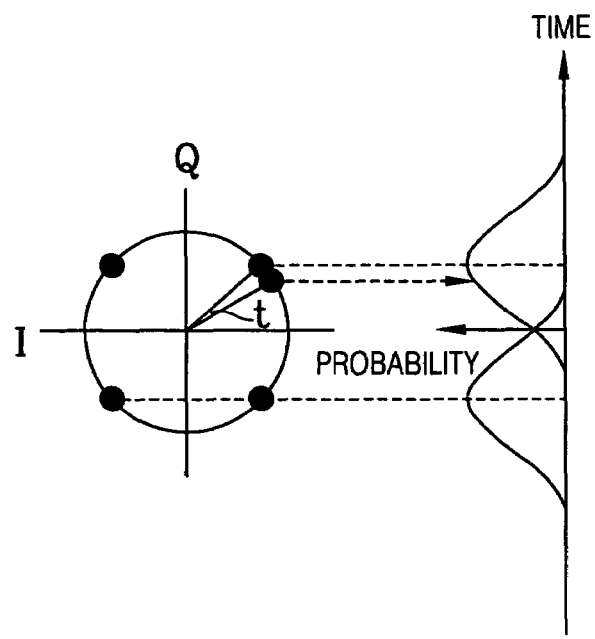
FIGS. 6A and 6B respectively illustrate cases where QPSK method and 16 QAM method are applied to the receiving apparatus of a high speed digital data communication system in accordance with an embodiment of the present invention.
Figure 6B:
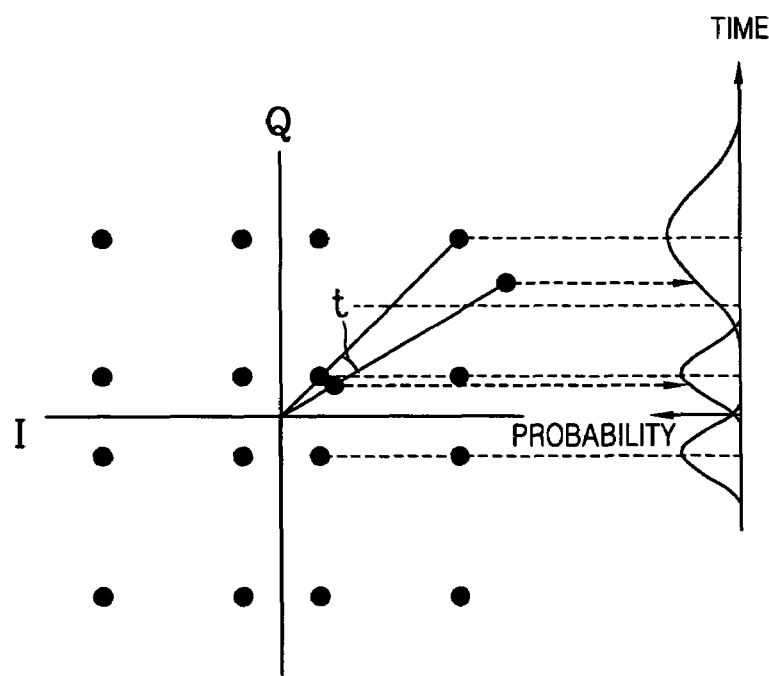

FIGS. 6A and 6B respectively illustrate cases where QPSK method and 16 QAM method are applied to the receiving apparatus of a high speed digital data communication system in accordance with an embodiment of the present invention, in which the same error is generated in each modulation method. Usually, in the 16 QAM, 16 data points are disposed at equal intervals. In an embodiment of the present invention, as shown in FIG. 6B, 12 outer data pointers are disposed to have greater intervals than that of the four inner data pointers. As the interval between the outer data pointers widens, the interval of the signal distribution probability graph centering around a line or column of data pointers increases while an overlapping space between the graphs decreases, so that the error probability can be considerably improved compared to 16 QAM or QPSK.

With reference to FIG. 6B, in the receiving apparatus of a high speed digital data communication system, a data is transited as a phase error as much as 't' is generated due to a noise, but the data is judged to have no error. That is, because the interval between outer data pointers is greater than the interval between the inner data pointers, an error possibly generated due to the phase error is significantly reduced.

Figure 7:
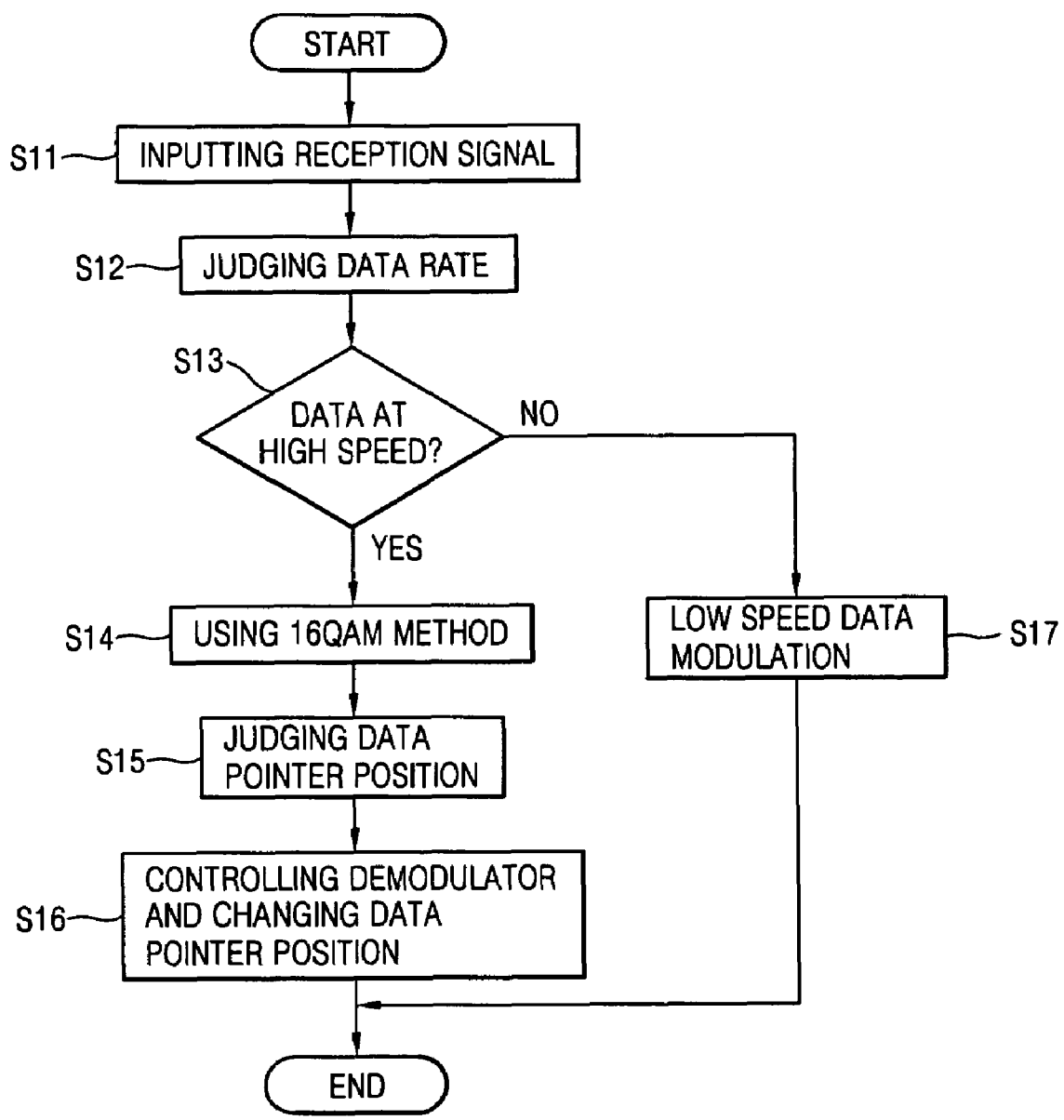
FIG. 7 is a flow chart of a receiving method of a high speed digital data communication system in accordance with an embodiment of the present invention.

FIG. 7 is a flow chart of a receiving method of a high speed digital data communication system in accordance with an embodiment of the present invention. First, an RF signal inputted through an antenna is amplified by the low noise amplifier 21, its spurious wave component is removed through the first band pass filter 22, which is then inputted to the frequency mixer 24. The RF signal inputted to the frequency mixer 24 is mixed with the output signal of the voltage control oscillator 23 and converted into an IF signal. The IF signal is inputted to the demodulator 27 through the second band pass filter 25. The demodulator 27 converts the inputted IF signal into I/Q signal, and the I/Q signal is inputted to the MSM 30 through the low pass filter.

The MSM 30 judges whether a data rate of the inputted signal is of a high speed (steps S12 and S13). If the received signal is a high speed data, the MSM recognizes that the 16 QAM modulation method is used (step S14). The MSM 30 judges positions of the 16 QAM data pointers (step S15) and transmits information on the positions of the data pointers to the controller.

The controller calculates a difference between the position of the data pointer of the received signal and a position of a basic data pointer and controls the demodulator, in order to change a position of the data pointer of the received signal (step S16). As for the data pointer of the QAM method, the interval between the inner data pointers and the outer data pointers is determined to be greater than the interval between the center and the inner data pointers. That is, by setting the interval between outer data pointers greater than the interval between inner data pointers, the error probability due to the phase error can be reduced and the system can be more stably operated.

However, if the signal received by the system is not a high speed data, the received signal is judged to have been modulated in the low speed data modulation method, and the received signal is demodulated on the basis of the basic data pointer without changing the position interval of the data pointer (step S17).

As so far described, the receiving apparatus and method of a high speed digital data communication system has the following advantages. By varying the position interval of data pointers according to the data rate of the received signal, for example, the error probability can be reduced. In addition, because the error probability is reduced by changing the position of the basic data pointer, receiver sensitivity can be improved and thus a signal transmission distance can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A receiving apparatus of a high speed digital data communication system comprising:
    a mobile station modem (MSM) for judging a modulation method according to a data rate of a received signal and a position of a data pointer;
    a controller for controlling a control signal with respect to a position change of the data pointer based on information collected by the MSM; and
    a demodulator for determining a new position of the data pointer according to the control signal outputted from the controller and for demodulating the signal, wherein the controller controls intervals between data pointers according to the data rate of the received signal.

2. The apparatus of claim 1, wherein the MSM comprises:
    an analog/digital converter for converting the received signal to a digital data; and
    a rate judging unit for judging a data rate of the received signal.

3. The apparatus of claim 1, wherein an interval between inner data pointers and outer data pointers is greater than an interval between a center and the inner data pointers.

4. A receiving apparatus of a high speed digital data communication system comprising:
    an amplifier for amplifying an inputted RF signal;
    a band pass filter for removing a spurious wave component of a signal outputted from the amplifier;
    a frequency mixer for mixing an output signal of the band pass filter and an output signal of a voltage control oscillator and outputting an IF signal;
    a mobile station modem (MSM) for judging a data modulation method according to a rate of a received data;
    a controller for generating a control signal for changing a position of a data pointer according to the data rate of a received signal, wherein the controller changes the position of the data pointer such that an interval b pointers is greater than an interval between a center and the inner data pointers; and
    a demodulator for demodulating an output signal of the frequency mixer according to the control signal.

5. The apparatus of claim 4, wherein the MSM includes a rate judging unit for judging the data rate of the received signal.

6. The apparatus of claim 4, wherein the data modulation method uses 16 QAM if the received signal is a high speed data.

7. A receiving method of a high speed digital data communication system comprising:
    judging a data modulation method of a received signal; and
    changing an interval between data pointers of the corresponding data modulation method, wherein the data modulation method is varied according to a data rate of the received signal.

8. The method of claim 7, wherein an interval between inner data pointers and outer data pointers is greater than an interval between a center and the inner data pointers.

9. A receiving method of a high speed digital data communication system comprising:
    judging a data rate of a received signal;
    determining a data modulation method;
    controlling a position interval of each data pointer of the corresponding data modulating method, wherein, in controlling the position interval of each of the data pointers, the interval between inner data pointers and outer data pointers is greater from corresponding positions of a basic data pointer; and
    changing and determining a position of a data pointer according to a control signal.

10. The method of claim 9, wherein the data modulation method uses a 16 QAM method if the received signal is a high speed data.

11. A receiving method of a high speed digital data communication system comprising:
    receiving a signal of a high speed data modulation format;
    controlling to change a position of an outer data pointer from a position of a basic data pointer; and
    demodulating the received signal centering around a changed data pointer.

12. The method of claim 11, wherein the position of outer data pointers is changed greater in an external direction from the position of the basic data pointer.

13. A communication system comprising:
    a judging device configured to judge a modulation format according to a data rate of a received signal and a data location, wherein the data location is at a predetermined distance with respect to an I/Q axis;
    a controller configured to generate a control signal with respect to a position change of the data location on the basis of the modulation method and the data rate, wherein the controller differs intervals between data locations according to the data rate of the received signal; and
    a demodulator configured to determine the data location according to the control signal outputted from the controller and to demodulate the received signal.

14. The communication system of claim 13, wherein the judging device comprises a rate judging unit for judging the data rate of the received signal.

15. The communication system of claim 13, wherein an interval between inner data locations and outer data locations is greater than an interval between a center of the I/Q axis and the inner data locations.

16. The communication system of claim 13, further comprising:
    an amplifier configured to amplify an inputted signal;
    a first band pass filter configured to remove a spurious wave component of a signal outputted from the amplifier;
    a frequency mixer configured to mix an output signal of the band pass filter and an output signal of a voltage control oscillator and outputting an IF signal; and
    a second band pass filter configured to filter a specific part of the IF signal and to output the filtered signal to the demodulator.

17. The communication system of claim 13, wherein the judging device comprises a mobile station modem (MSM).

18. The communication system of claim 17, wherein the judging device further comprises a low pass filter configured to filter the output of the demodulator.

19. The communication system of claim 13, wherein th format uses 16 QAM if the received signal is a high speed data signal.

20. The communication system of claim 13, wherein the judging device, the controller and the demodulator form part of a receiver.

21. The communication system of claim 13, wherein the communication system is a wireless communication system.

* * * * *